May 17, 1960  E. W. SELNAU  2,937,227
GROUNDING CLAMP AND CONNECTOR FOR ABUTTING WIRE DUCTS
Filed June 14, 1957

INVENTOR.
Elmer W. Selnau
BY
Howson and Howson.

United States Patent Office 2,937,227
Patented May 17, 1960

2,937,227
GROUNDING CLAMP AND CONNECTOR FOR ABUTTING WIRE DUCTS

Elmer W. Selnau, Bristol, Conn., assignor to The Wiremold Company, West Hartford, Conn., a corporation of Connecticut Application June 14, 1957, Serial No. 665,701

11 Claims. (Cl. 174—84)

This invention relates to means for connecting together adjacent sections of metal electric wire ducts or raceways firmly and, at the same time, making a good electrical connection between these sections to provide a continuous ground connection.

The invention is applicable to duct sections which are in alignment or come together at right angles or otherwise.

Metal electrical wiring ducts for continuous insulated electric conductors or wires are commonly formed of a back or base strip over which a cover strip lies and in many cases interlocks as the cover and base strip are pressed or snapped into engagement. Customarily the ducts are grounded. When one section abuts another, the problem is to provide a good continuous ground connection between the two at the same time that the sections are physically connected together.

Thus, one object of the invention is to provide a good firm permanent electrical and mechanical connection which can be economically fabricated and easily applied with a minimum amount of labor.

Another object is to provide a sheet metal clamping device for connecting together adjacent metal wiring duct sections which can be put in place easily at the desired location and permanently secured by merely tightenining two screws.

Another object is to create a connecting device of the aforementioned type on principles which are applicable to connectors for aligned or for angular abutments of wiring duct sections.

Other objects and advantages of the invention will appear as it is described in connection with the accompanying drawings.

Figure 2:
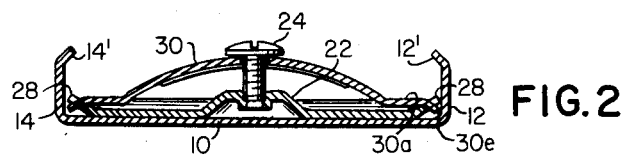
Fig. 2 is a transverse section view on line 2—2 of Fig. 1 with the connecting device loosely placed in position.

Referring to the drawings, the invention is shown as applied to electric wiring ducts of the sort shown in Patent No. 2,743,423 of W. E. Parks, issued April 24, 1956. Such ducts have a base strip in the form of a channel having a flat back wall 10 and parallel side walls 12 and 14 bent up at right angles to the back walls with their edges bent obliquely inward, forming lips 12', 14'. A sheet metal cover member (not shown) is also in channel form and has its edges shaped to interlock with the lips of the base as described in said patent.

It will be understood, however, as the invention is described, that the invention is not limited to the form of duct or raceway mentioned and illustrated, but is applicable to various other forms of ducts.

For connecting ducts A and B in alignment, a connecting and clamp supporting plate, designated generally by the numeral 20, is stamped from sheet metal with two spaced raised bosses 22 in the longitudinal center line of the plate. Each boss is pierced and tapped for the reception of securing bolts 24, 25. Over each boss is placed a bowed clamping strip 30, 32 of stiff spring metal harder than the duct material. Portions 30a and 32a adjacent the ends of these clamping strips are bent to lie parallel to the back wall 10 of the duct when the strips are loosely spaced in position, as shown in Fig. 2; but the extreme edge portions 30e and 32e are bent to point into corners of the raceway when the strip is put in place (see Fig. 2) and are serrated to provide teeth for biting into the side walls 12 and 14 of the duct.

To support the clamping strip on a fulcrum edge at the joint between the flat portion 30a and the bent down serrated edge portion 30e (or 32a and 32e), the edge portion 28 of the connecting and clamp supporting plate 20 is bent up at an oblique angle (30° to the horizontal approximately) and is cut away, for a distance slightly greater than the width of the clamping strip, providing notches 28n through which the clamping strips extend.

Figure 3:
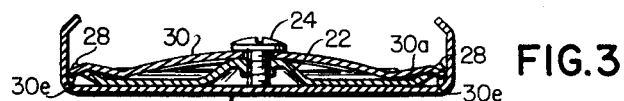
Fig. 3 is a view similar to Fig. 2 with the securing screw tightened to secure the clamp and connector for permanent connecting condition.

As the screws 24, 25 are tightened onto the clamping strips 30 and 32, the bow or arch of the clamping strip flattens due to pressure of the underside of the screwhead on the surface of the clamp, as shown in Fig. 3. During this flattening, the longitudinal edges of the notches 28 act as fulcrums about which pivot the portions of the strip on either side of the screw. This pivoting, together with the elongation of the clamping strip due to its flattening, causes the teeth to bite into and scrape over the inside surface of the side walls 12 and 14 of the duct as the teeth and edge travel in a curved path from the bottom upwardly.

The clamping strip is firmly secured to the duct by the wedging and biting action of the clamping strip, which at the same time by its teeth scraping the metal of the ducts and biting into it, affords a good electrical connection between the clamping strip and the duct.

By placing a connecting plate so that one half lies in one duct section and the other half lies in the second section abutting the first, the two sections can be connected and secured together. Thus, the clamping strips are secured to the plate 20 by the screws 24, 25 both electrically and physically, and the plate is joined to the adjoining sections by reason of the engagement of the clamps with the side walls of the ducts.

The clamping strips 30, 32 are preferably formed so that when in the unstressed condition as illustrated in Fig. 2, their overall length is slightly less than the distance between the inside surfaces of the parallel side walls 12 and 14 of the duct. Similarly, the width of the connecting and supporting plate 20 is made so that its overall dimension is less than the distance between said side walls.

To add transverse stiffness to the plate 20 and prevent buckling and distortion, three or more spaced transverse ribs may be pressed into the plate adjacent the ends and middle of the plate, respectively.

Figure 4:
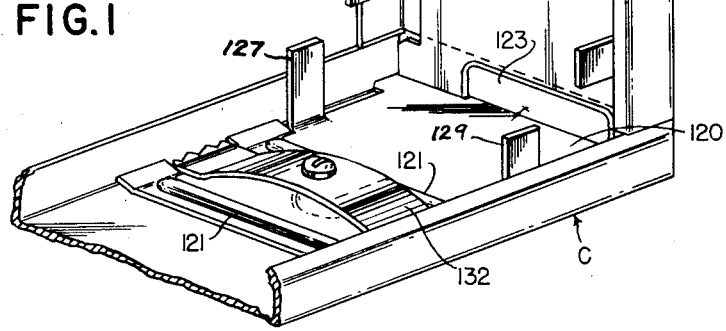
Fig. 4 is a perspective view, partly broken away, of the invention as applied to duct sections abutting at right angles.

When it is desired to connect two ducts C and D together at right angles, the connecting and supporting plate 120 which is made longer than before is bent transversely of its length at its mid-line, at a right angle, as illustrated in Fig. 4. In this form of the invention, the clamping strips 130 and 132 are the same as clamping strips 30 and 32 in Figs. 1–3 and they cooperate with the two ends or arms of the connecting and supporting plate 120 in the same way as before.

In order to guide the wires around the bend and prevent their getting caught or pinched within the duct when the cover is applied, a pair of guide fingers 127, 129 are formed on each arm of the connecting and supporting plate 120 located between the bend of the plate and the clamping strips 130 and 132, respectively. These guide fingers limit lateral movement of the wires to a predetermined area to achieve the desired end.

At the midpoint lengthwise of the connecting and supporting plate 120 where the angle bend is, an oblong opening may be formed in one arm for the passage of conductor wires (not shown), if it is desired to have them continue through into an injunction aligned strip or for any other reason. The end of the duct is otherwise closed by the bent up leg of the connecting and supporting member 120. The opening 123 may be provided as a knockout to be removed only when an opening is needed.

Figure 1:
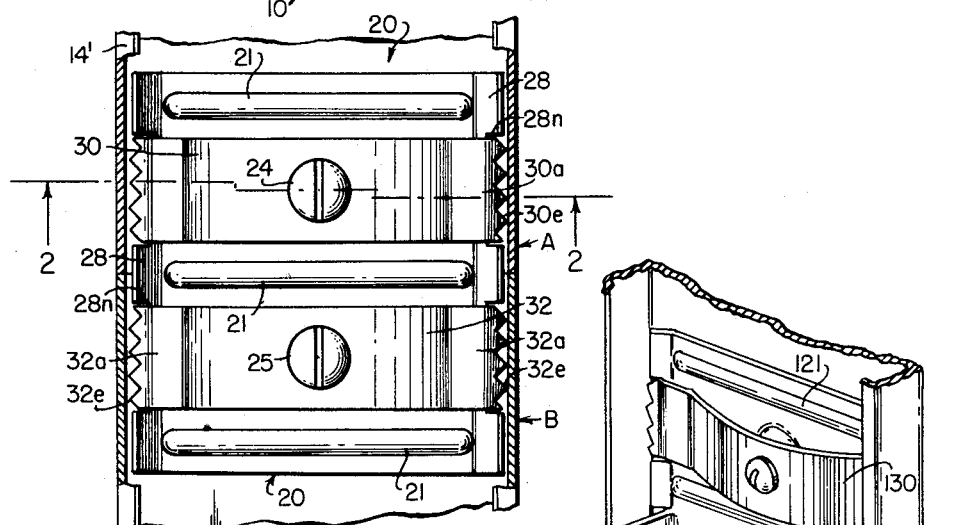
Fig. 1 is a plan view, partly broken away, of the invention as applied in connecting aligned abutting sections.

Stiffening ribs 121 are provided in the connecting and supporting plate 120 as in the form of invention illustrated in Figs. 1-3 near to and paralleling the clamping members 130, 132.

Many modifications of the invention will occur to those skilled in the art. Therefore, the invention is not limited to the specific forms illustrated and described.

What is claimed is:

1. A connection for connecting abutting channel-shaped electric wiring duct sections having side and back walls comprising plate means within the duct sections adapted to be seated partly on the back wall of one section and partly on the back wall of an abutting section, clamping means within the duct sections engaging the portions of said plate means lying in each of said two abutting sections, means passing freely through said clamping means and drawing said plate means and clamping means toward each other and also securing them to said two sections and securing said sections together electrically and mechanically.

2. A connection for connecting abutting channel-shaped electric wiring duct sections having side and back walls comprising plate means within the duct sections adapted to be seated partly on the back wall of one section and partly on the back wall of an abutting section, clamping means in each section overlying said plate means, means to secure said clamping means to said plate means, said securing means acting on said clamping means to cause the latter to bite into and make clean electrical connection with said duct sections.

3. A connection for connecting abutting channel-shaped electric wiring duct sections comprising plate means within the duct sections adapted to be seated partly on the back wall of one section and partly on the back wall of an abutting section, bowed resilient clamping means within the duct sections overlying the parts of said plate means which lie in each section, means to secure said clamping means to said plate means and flattening the bowed portion to elongate it into clamping engagement with the side walls of the ducts.

4. A connection as claimed in claim 3 having means on the end of said clamping means for biting into said duct walls as the clamping means flattens.

5. A connection for connecting abutting channel-shaped electric wiring duct sections having side and back walls comprising plate means within the duct sections adapted to be seated partly on the back wall of one section and partly on the back wall of an abutting section, clamping means within the duct sections engaging the portions of said plate means lying in each of said two abutting sections, means to secure said clamping means to said plate means and also to said two sections to secure and to electrically connect said sections together, and means on said plate means which provides fulcrum points for said clamping means, whereby when said securing means acts on said clamping means the latter moves over and bites into the duct walls.

6. A connection for connecting abutting channel-shaped electric wiring duct sections having side and back walls comprising plate means within the duct sections adapted to be seated partly on the back wall of one section and partly on the back wall of an abutting section, clamping means within the duct sections engaging the portions of said plate means lying in each of said two abutting sections, means to secure said clamping means to said plate means and also to said two sections to secure and to electrically connect said sections together, the edges of said plate means being bent away from the back wall of said ducts providing fulcrums on which said clamping means rests and pivots as said securing means moves said clamping means, whereby the clamping means scrapes over and bites into the duct walls.

7. A connection for connecting abutting channel-shaped electric wiring duct sections having side and back walls comprising plate means within the duct sections adapted to be seated partly on the back wall of one section and partly on the back wall of an abutting section, bowed clamping means within the duct sections engaging the portions of said plate means lying in each of said two abutting sections, means to secure said clamping means to said plate means and also to said two sections to secure and to electrically connect said sections together, said securing means engaging and flattening said clamping means and elongating it into engagement with said duct walls, and fulcrum means causing said clamping means to move arcuately over the duct walls and to bite into said walls.

8. A connection as claimed in claim 7 wherein the fulcrum means is provided by bending the edge portions of said plate means away from the back wall of said duct.

9. A connection for connecting abutting channel-shaped electric wiring duct sections having side and back walls comprising plate means within the duct sections adapted to be seated partly on the back wall of one section and partly on the back wall of an abutting section, clamping means within the duct sections engaging the portions of said plate means lying in each of said two abutting sections, means to secure said clamping means to said plate means and also to said two sections to secure and to electrically connect said sections together, said plate means being bent to join duct sections abutting at an angle.

10. A connection as claimed in claim 9 wherein the plate section closes the joint between the abutting duct sections.

11. A connection as claimed in claim 3 in which the clamping means have serrated ends which are directed, when unstressed, toward the corners formed by intersecting side and back duct walls.

References Cited in the file of this patent

UNITED STATES PATENTS

| 821,876 | Lauth | May 29, 1906 |
| 2,197,737 | Appleton | Apr. 16, 1940 |
| 2,657,823 | Skinner | Nov. 3, 1953 |

FOREIGN PATENTS

| 660,919 | Great Britain | Nov. 14, 1951 |
| 830,273 | Germany | Feb. 4, 1952 |
| 1,132,660 | France | Oct. 4, 1955 |